(12) United States Patent
Kohlen et al.

(10) Patent No.: US 7,237,453 B2
(45) Date of Patent: Jul. 3, 2007

(54) ACCELERATION PEDAL MODULE WITH CONTROLLABLE FRICTION DEVICE

(75) Inventors: Peter Kohlen, Neu Anspach (DE); Christian Reimann, Wehrheim (DE); Joachim von Willich, Nieder-Selters (DE)

(73) Assignee: Siemens AG, München (DE)

( * ) Notice: Subject to any disclaimer, the term of this patent is extended or adjusted under 35 U.S.C. 154(b) by 0 days.

(21) Appl. No.: 11/024,711

(22) Filed: Dec. 30, 2004

(65) Prior Publication Data

US 2005/0145058 A1 Jul. 7, 2005

Related U.S. Application Data

(63) Continuation of application No. PCT/DE03/002035, filed on Jun. 18, 2003.

(30) Foreign Application Priority Data

Jul. 8, 2002 (DE) ................. 102 30 724

(51) Int. Cl.
  *G05G 1/14* (2006.01)
  *G05G 5/06* (2006.01)
(52) U.S. Cl. ............ 74/513; 74/512; 74/514; 74/531
(58) Field of Classification Search ......... 74/512, 74/513, 560, 514, 531; 477/133, 136, 141; *G05G 1/14*
  See application file for complete search history.

(56) References Cited

U.S. PATENT DOCUMENTS

| | | | |
|---|---|---|---|
| 3,052,421 A * | 9/1962 | Fischer | 242/412.1 |
| 4,542,864 A * | 9/1985 | Hart | 242/333 |
| 4,664,232 A * | 5/1987 | Takagi et al. | 188/74 |
| 4,669,686 A * | 6/1987 | Huber et al. | 242/422.4 |
| 5,529,296 A | 6/1996 | Kato et al. | |
| 6,098,971 A | 8/2000 | Stege et al. | |
| 6,105,258 A * | 8/2000 | Akaike | 30/276 |
| 6,109,133 A * | 8/2000 | Kohlen | 74/512 |
| 6,250,176 B1 * | 6/2001 | Reimann et al. | 74/512 |
| 6,446,526 B2 * | 9/2002 | Reimann et al. | 74/512 |
| 6,758,114 B2 * | 7/2004 | Sundaresan et al. | 74/512 |
| 2002/0005080 A1* | 1/2002 | Reimann et al. | 74/512 |
| 2004/0259687 A1* | 12/2004 | Ritter et al. | 477/187 |

FOREIGN PATENT DOCUMENTS

DE 19737289 A1 3/1999

(Continued)

OTHER PUBLICATIONS

Derwent Abstract—DE-10122162A1; Nov. 14, 2003; Volkswagen AG, D-38440 Wolfsburg (Germany).

(Continued)

*Primary Examiner*—Vinh T. Luong

(57) ABSTRACT

A power control device for drive motors in motor vehicles, in particular an accelerator pedal, includes an operating lever which may be operated by an operating force against a return force from a rest position on pivoting about a pivot axis. A damping device for damping the pivot motion of the operating lever is also included. The damping device is a friction device which includes a friction element. The friction element acts upon a component of the operating lever such that in addition to the return force a friction force is also overcome during a pivot movement of the operating lever in a direction away from the rest position.

12 Claims, 2 Drawing Sheets

FOREIGN PATENT DOCUMENTS

| | | |
|---|---|---|
| DE | 10042549 A1 | 3/2002 |
| DE | 10122162 A1 | 11/2002 |
| EP | 0 923 015 A2 * | 6/1999 |
| WO | WO 97/30863 | 8/1997 |
| WO | WO 98/14857 | 4/1998 |
| WO | WO 99/47986 * | 9/1999 |

OTHER PUBLICATIONS

Derwent Abstract—DE-19737289A1; Mar. 4, 1999; Mannesmann VDO AG, D-60388 Frankfurt (Germany).

Derwent Abstract—DE-10042549A1; Mar. 14, 2002; Volkswagen AG, D-38440 Wolfsburg (Germany).

* cited by examiner

ACCELERATION PEDAL MODULE WITH CONTROLLABLE FRICTION DEVICE

CROSS REFERENCE TO RELATED APPLICATIONS

The present application is a continuation of International Application PCT/DE03/002035, filed Jun. 18, 2003, which designated the United States, and further claims priority to German patent application DE10230724.5, filed Jul. 8, 2002, the both of which are herein incorporated by reference.

BACKGROUND OF THE INVENTION

The invention relates to a power control device for drive motors of motor vehicles, in particular an accelerator pedal, having an operating lever which can be actuated by an operating force, so that from a rest position it can pivot about a pivot axis against a return force, and having a damping device damping the pivoting motion of the operating lever, the damping device being a friction device, which has a friction element, which is capable of acting on the operating lever and/or a component of the operating lever in such a way that for the pivoting motion of the operating lever in a direction away from the rest position a friction force can be overcome in addition to the return force.

Damping the pivoting motion of the operating lever in such power control devices, by allowing a spring force, in addition to the return force, to act on the operating lever in the return direction from a specific deflection position onwards is already known. Having to overcome this force threshold is intended to convey a tangible signal to the operator of the operating lever.

At the same time, in the pivoting range of the operating lever in excess of this force threshold the operator always has to apply the spring force in addition to the return force, irrespective of whether a pivoting motion ensues or the operating lever is held in a deflection position.

In the pivoting range in excess of the force threshold, the additional return force also continues to act in the return direction of the operating lever.

Power control devices of the type specified in the introductory part are disclosed by DE 100 42 549 A and U.S. Pat. No. 6,098,971, which have fixed hystereses of the pedal force over the pedal travel.

SUMMARY OF THE INVENTION

The object of the invention therefore is to create a power control device of the type stated in the introductory part, which in a pivoting motion of the operating lever from a rest position provides damping only during the course of the swiveling motion.

According to the invention this object is achieved in that the friction device capable of acting upon the operating lever and/or the component of the operating lever can be additionally activated either manually or automatically.

At the same time, in a motor vehicle, for example, the hysteresis of the operating force can be adjusted via the deflection travel of the operating lever as a function of the condition of the respective road surface, so that on poor road surfaces damping for steady holding of the operating lever is possible.

The friction force which, from a specific deflection position of the operating lever, also has to be overcome in addition to the return force, only has to be applied when a pivoting motion of the operating lever in a direction of deflection away from the rest position actually ensues and when there is a need to draw attention to a specific situation.

If the operating lever is held in a position in excess of a specific deflection position, the operator only has to apply a force counteracting the return force, but no additional force, so that the operating lever can be held in this position with a low level of force.

However, since even small deflection movements of the operating lever can mean that an additional friction force has to be overcome, the operating lever can be very steadily held in the deflection position.

A constant friction force of the friction device means that the gradient of the actuating force which the operator has to apply to the operating lever remains the same over its entire pivoting range in the case of a return force generated by a spring.

The friction device can furthermore be activated as a function of operating parameters of the motor vehicle.

At the same time the friction device may also be activated as a function of the pivoting position of the operating lever and/or as a function of the road speed of the motor vehicle and/or as a function of a distance between the motor vehicle and another moving vehicle in front and/or of the pivoting speed of the operating lever.

In order to obtain information on such operating parameters, the pivoting position of the operating lever can be detected by an angle sensor, the road speed of the motor vehicle by a road speed sensor, the distance from another vehicle in front by a distance sensor and the pivoting speed of the operating lever by a motion sensor.

For automatic activation of the friction device, an activation signal can preferably be generated by an electronic control unit and the friction device can be activated by the activation signal.

For this purpose a signal can be generated by the angle sensor and/or the road speed sensor and/or the distance sensor and/or the motion sensor and fed to the electronic control unit, which is capable of generating the activation signal for activation of the friction device as a function of this signal.

The operator of the operating lever receives further tangible information on specific driving situations in that a wheel-slip signal from a transaction control system and/or a set speed from a cruise control system and/or a speed governor can be fed to the electronic control unit, which is capable of generating the activation signal for activation of the friction device as a function of these signals.

Decoupling the damping device from the operating device as the operating lever is pivoted in a direction towards the rest position ensures that if the operating lever is not actuated, it moves rapidly and unimpeded into its rest position. Hazardous driving situations due to non-return or delayed return of the operating lever into its rest position are therefore avoided.

Only the return force acts in the return direction of the operating lever motion.

For this purpose the friction element can be disengaged from the operating lever and/or the component of the operating lever.

One possibility here is to make the component of the operating lever connectable to the operating lever via a clutch, the clutch being either a friction clutch or a geared clutch or a claw clutch.

A simple design construction for this purpose is achieved in that the operating lever is firmly arranged on a pivotally supported pivot shaft coaxial with the pivot axis, said shaft being connected or capable of connection to the damping device.

At the same time a clutch disc, to which a friction wheel of the friction device, coaxially supported and freely rotatable therewith, can be coupled by the clutch, may be firmly arranged on the pivot shaft, the friction element being capable of acting on the friction wheel.

For decoupling the damping device from the operating lever, a freewheel, which during a pivoting motion of the operating lever in a direction towards the rest position decouples the clutch area from the area that can be acted upon by the friction element, and rotationally locks them together during a pivoting movement of the operating lever in the opposite direction, may be arranged between the clutch area of the friction wheel and the area of the friction wheel that can be acted upon by the friction element.

A friction wheel of the friction device, which can be acted upon by the friction element may be arranged on the pivot shaft, the friction element preferably being arranged on a pivoted lever, which is capable of pivoting about a pivot axis and which can be pivotably driven by a pivot drive.

A likewise simply constructed means of decoupling the damping device from the operating lever, is to arrange a freewheel between the pivot shaft and the friction wheel, the freewheel decoupling the friction wheel from the pivot shaft during a pivoting motion of the operating lever in a direction towards the rest position and rotationally locking them together during a pivoting motion of the operating lever in the opposite direction.

The freewheel may be a sleeve-type freewheel, as is described in DE 197 37 289 A1. Express reference is made to the disclosure of this DE 197 37 289 A1.

A further friction wheel, which can be acted upon by a further friction element, may be firmly arranged on the pivot shaft.

If, in this case, the further friction element is arranged on a pivoted lever, which is capable of pivoting about a fixed pivot axis and is acted upon by one end of a spring with the friction element bearing on the further friction wheel, the other end of which spring is supported on a lever arm of the operating lever, this serves to generate the return force.

DETAILED DESCRIPTION OF THE INVENTION

Exemplary embodiments of the invention are represented in the drawing and are described in more detail below, wherein.

DETAILED DESCRIPTION OF THE INVENTION

Figure 1:
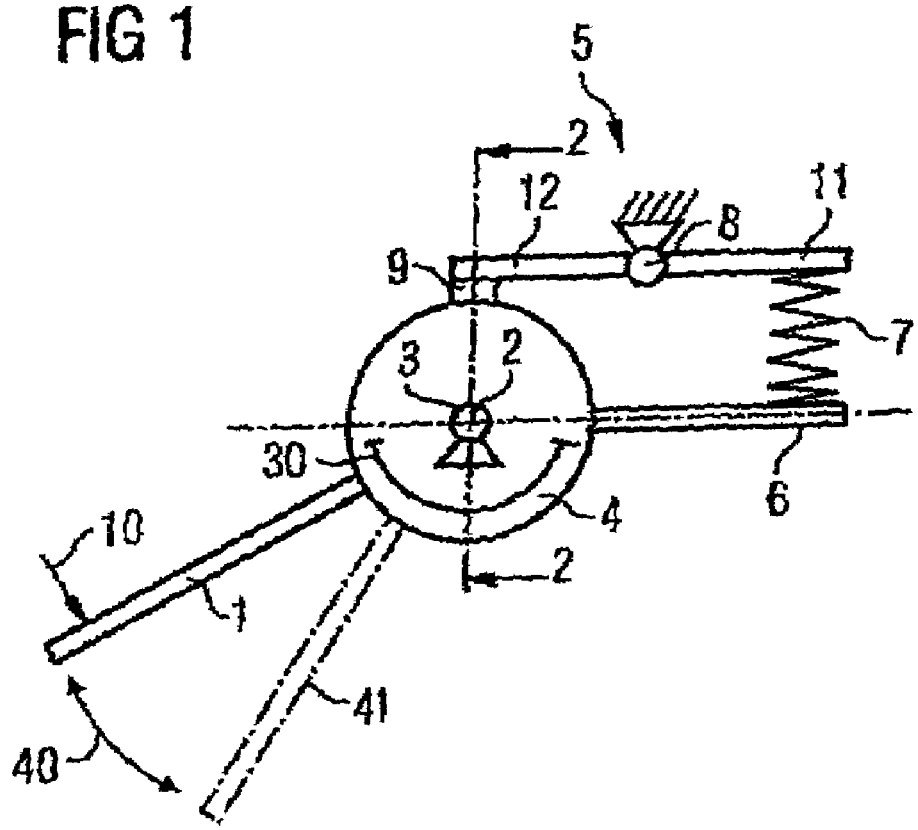
FIG. 1 depicts a side view of a general representation of a first exemplary embodiment of a power control device.

The power control devices shown have an operating lever 1 of an accelerator pedal of a motor vehicle, which under a manual actuating force is capable of pivoting 40 from a rest position (FIG. 1) about a pivot axis 2. The lever in a pivoted state is depicted in dashed lines 41. The operating lever 1 extending radially to the pivot axis 2 is at the same time fixed by one end to a first friction wheel 4, which is firmly arranged on a rotatably supported pivot shaft 3 coaxial with the pivot axis 2.

Also projecting radially from the friction wheel 4 is a lever arm 6, on the free end of which a compression spring 7 is supported by its one end. With the other end the prestressed compression spring 7 acts upon the one arm 11 of a two-armed pivoted lever 5, which is capable of pivoting about a fixed pivot axis 8, and on the second arm 12 of which a friction element 9 is arranged. Actuated by the pivoted lever 5, the friction element 9 is held by the compression spring 7 in preloaded contact against the radially circumferential surface of the friction wheel 4.

When the operating lever 1 is acted upon by a pedal force 10, the friction wheel 4 is swiveled counterclockwise from its rest position shown. The lever arm 6, likewise swiveled in the process, thereby compresses the compression spring 7, so that a greater spring force acts upon the first arm 11. However, a greater force thereby presses friction element 9 against the friction wheel 4, so that as the deflection from the rest position increases, the return force generated by the compression spring 7 and the friction force that is generated on the friction wheel by the friction element 9 and which has to be overcome, both increase.

Figure 4:
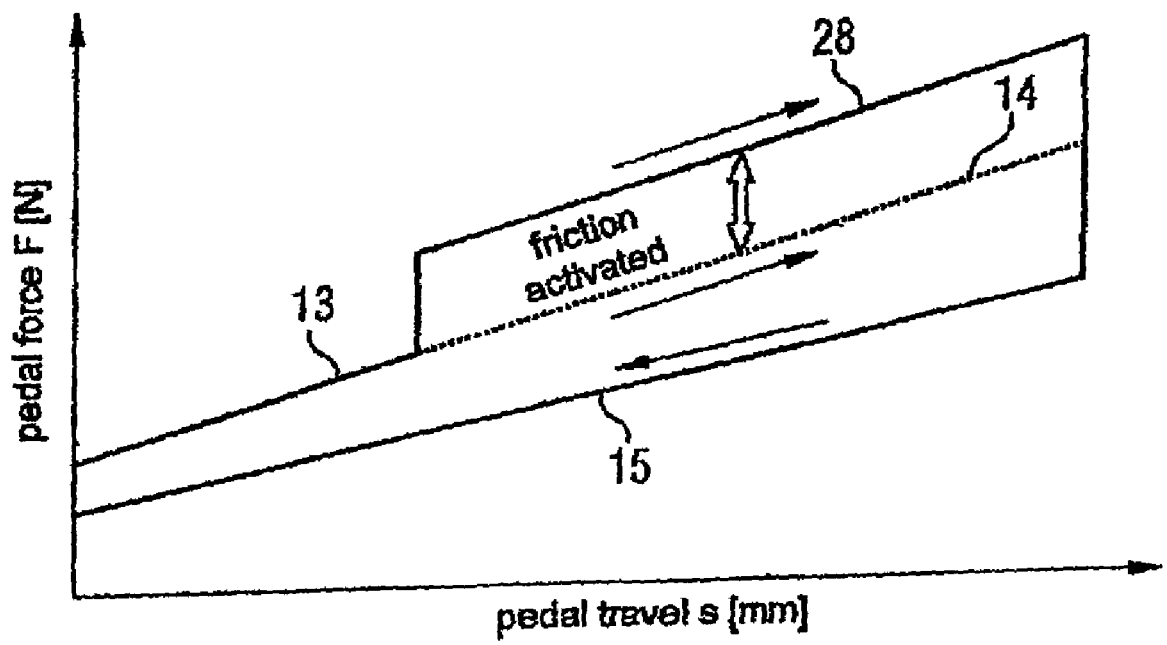
FIG. 4 depicts a diagram of the pedal force over the pedal travel of the power control devices according to FIGS. 1 to 3.

As is shown in FIG. 4, over the pedal travel an hysteresis of the pedal force 10 is obtained, in which the pedal force increase linearly on a higher level. This is represented by the initially continuous upper line 13, which is continued by the broken line 14. On a lower level of the pedal force this diminishes linearly again according to the lower line 15 as the pedal lever 1 returns towards the rest position.

Figure 2:
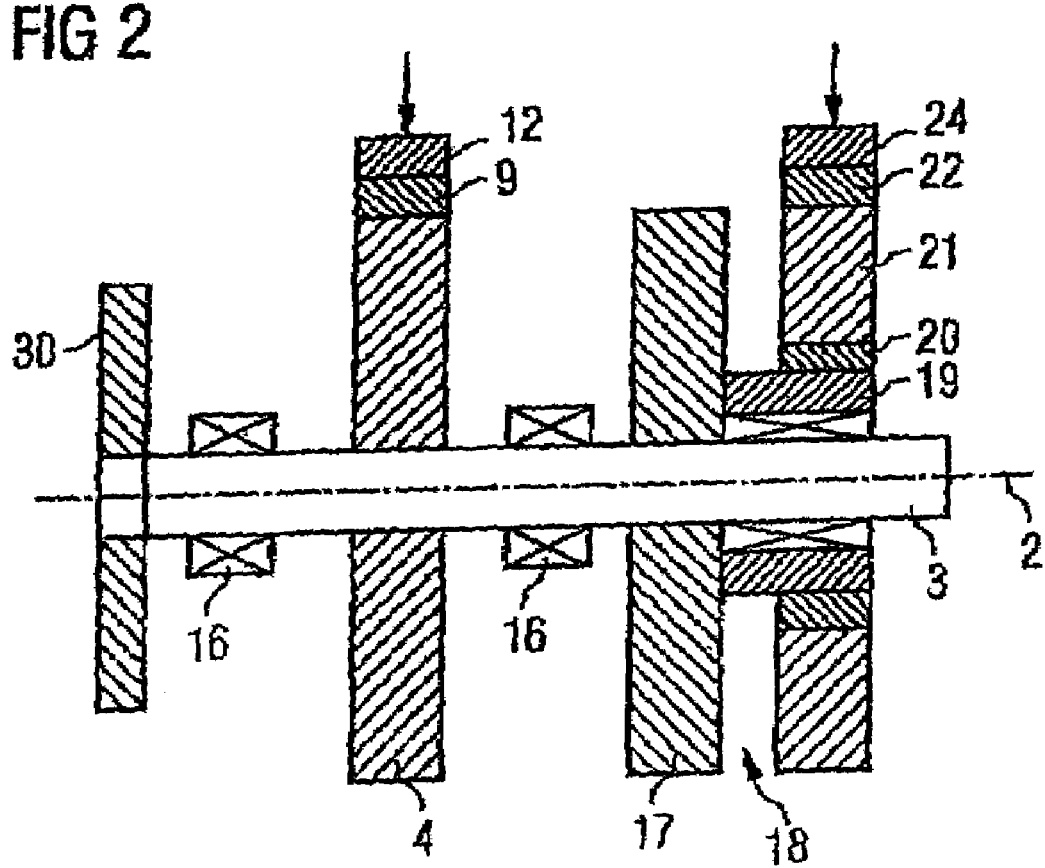
FIG. 2 depicts a cross-sectional view of a general representation of the power control device of FIG. 1.

As is shown in FIG. 2, depicting a cross sectional view of the power control device of FIG. 1 along line 2-2, both the first friction wheel 4 and a clutch disc 17 of a friction clutch 18 are firmly arranged on the pivot shaft 3, rotatably supported by means of bearings 16.

A clutch sleeve 19, which by means of a clutch drive can be pressed by its one end face in the form of a friction surface against the opposing end face of the clutch disk 17, likewise in the form of a friction surface, is supported on the pivot shaft 3 where it is free to rotate, coaxially next to the clutch disc 17.

The clutch drive may be any suitable drive. One design possibility is to use an electromagnetic clutch drive.

By way of a sleeve-type freewheel 20 arranged on the radially circumferential surface of the clutch sleeve 19, a second friction wheel 21 is arranged on the clutch sleeve 19 coaxially with the pivot axis 2. The sleeve-type freewheel 20 means that as the clutch sleeve 19 rotates in a direction away from the rest position the second friction wheel 21 is driven, rotationally locked, by the clutch sleeve 19, whereas when the clutch sleeve 19 rotates in a direction towards the rest position the second friction wheel 21 turns freely on the clutch sleeve 19.

Like the first friction wheel 4, the second friction wheel 21 is also acted upon on its radially circumferential surface by a second friction element 22, which is arranged on an arm 24 of a pivoted lever 26 free to pivot about a fixed pivot axis 23 and is pressed against the second friction wheel 21 by a prestressed compression spring 27.

Once the friction clutch 18 is closed, in the event of a deflection movement of the operating lever 1 a further additional friction force, generated by the friction element on the second friction wheel 21, also has to be overcome in addition to the return force of the compression spring 7 and the friction force generated by the friction element 9. This means that instead of the pedal force according to the broken line 14 in FIG. 4, it is necessary to apply a force corresponding to the line 28 running at a higher level, which is tangibly perceived by the operator. However, this increased pedal force only has to be applied during the pivoting motion of the operating lever 1 in a direction away from the rest position. In the case of movement towards the rest position the additional friction force is decoupled by the sleeve-type freewheel 20. Likewise when holding the operating lever 1 in a position it is only necessary to apply the return force of the compression spring 7.

The deflection position, from which the additional friction force of the second friction element 22 acting upon the second friction wheel 21 has to be applied, is determined by the closing of the friction clutch 18.

For this purpose the friction clutch 18 can be closed as a function of the many varied operating parameters of the motor vehicle or as a function of a specific pivoting position of the operating lever 1. Such a specific pivoting position may be detected by an angle sensor that is shown as a position disc 30, which is firmly connected to the pivot shaft 3.

Figure 3:
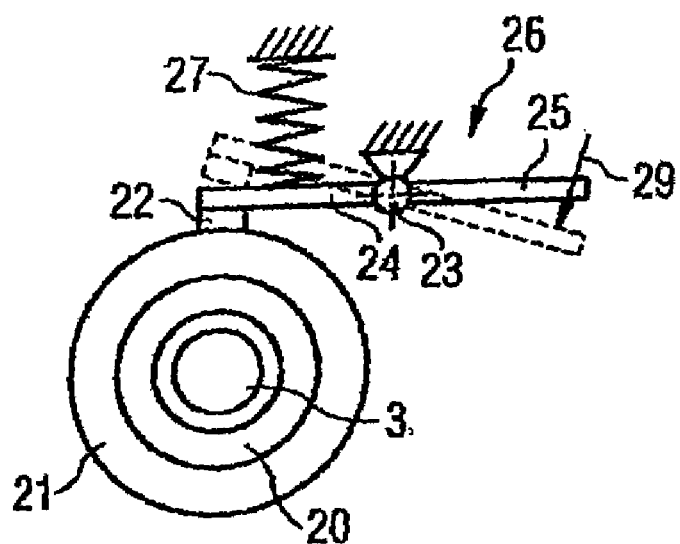
FIG. 3 depicts a side view of a general representation of a second exemplary embodiment of a power control device.

FIG. 3 shows another possible way of activating the additional friction force to be applied. Instead of the friction clutch 18 in the exemplary embodiment in FIGS. 1 and 2, the second friction wheel is arranged directly on the pivot shaft 2 by way of a sleeve-type freewheel. The pivoted lever 26 in this case a two-armed pivoted lever 26, the first arm 24 of which carries the friction element 22 and the second arm 25 of which can be acted upon, against the force of the compression spring 27, by a pivot drive (not shown) with decoupling force, which lifts the friction element off from the friction wheel 21 (broken line). The pivot drive may be activated according to the activation of the friction clutch 18.

The invention claimed is:

1. A power control device for a drive motor of a motor vehicle, comprising:
    an operating lever arranged to be actuated by an operating force so that from a rest position the operating lever pivots about a pivot axis against a return force,
    a damping device arranged to damp the pivoting motion of the operating lever, the damping device being a friction device comprising:
        a first friction element and a first friction wheel arranged to be acted upon by the first friction element,
        a second friction element and a second friction wheel arranged to be acted upon by the second friction element,
        wherein the first and second friction wheels are arranged on a first shaft,
        wherein the damping device is arranged to act upon at least one of the operating lever and a component of the operating lever such that for the pivoting motion of the operating lever in a direction away from the rest position, a friction force is overcome in addition to the return force,
    wherein the friction device is configured to act upon at least one of the operating lever and the component of the operating lever, and
    wherein the friction device is arranged to be activated by an activation signal.

2. The power control device according to claim 1, wherein the activation signal is a function of operating parameters of a motor vehicle.

3. The power control device according to claim 1, wherein the activation signal is a function of at least one of a pivoting position of the operating lever, a road speed of a motor vehicle, a distance between the motor vehicle and another moving vehicle in front, and a pivoting speed of the operating lever.

4. The power control device according to claim 1, wherein the activation signal is a function of at least one of a wheel-slip, cruise control speed, and speed from a speed governor.

5. The power control device according to claim 1, wherein the damping device is decoupled from the operating lever during a pivoting motion of the operating lever in a direction towards the rest position.

6. The power control device according to claim 1, wherein the component of the operating lever is connected to the operating lever by way of a clutch.

7. The power control device according to claim 6, wherein the clutch is one of a friction clutch, a geared clutch and a claw clutch.

8. The power control device according to claim 6, wherein a clutch disc is firmly arranged on the first shaft in proximity of the second friction wheel.

9. The power control device according to claim 1, wherein the second friction element is arranged on a second lever configured to pivot about a second pivot axis.

10. The power control device according to claim 1, further comprising a freewheel arranged to decouple the second friction wheel from the first shaft during a pivoting motion of the operating lever in a direction towards the rest position and rotationally lock the second friction wheel and first shaft together during a pivoting motion of the operating lever in an opposite direction, wherein the freewheel is arranged between the first shaft and the second friction wheel.

11. The power control device according to claim 10, wherein the freewheel is a sleeve-type freewheel.

12. The power control device according to claim 1, wherein the first friction element is arranged on a first lever configured to pivot about a first pivot axis and acted upon by one end of a spring with the first friction element bearing on the first friction wheel and the other end of the spring is supported on a lever arm of the operating lever.

* * * * *